UNITED STATES PATENT OFFICE.

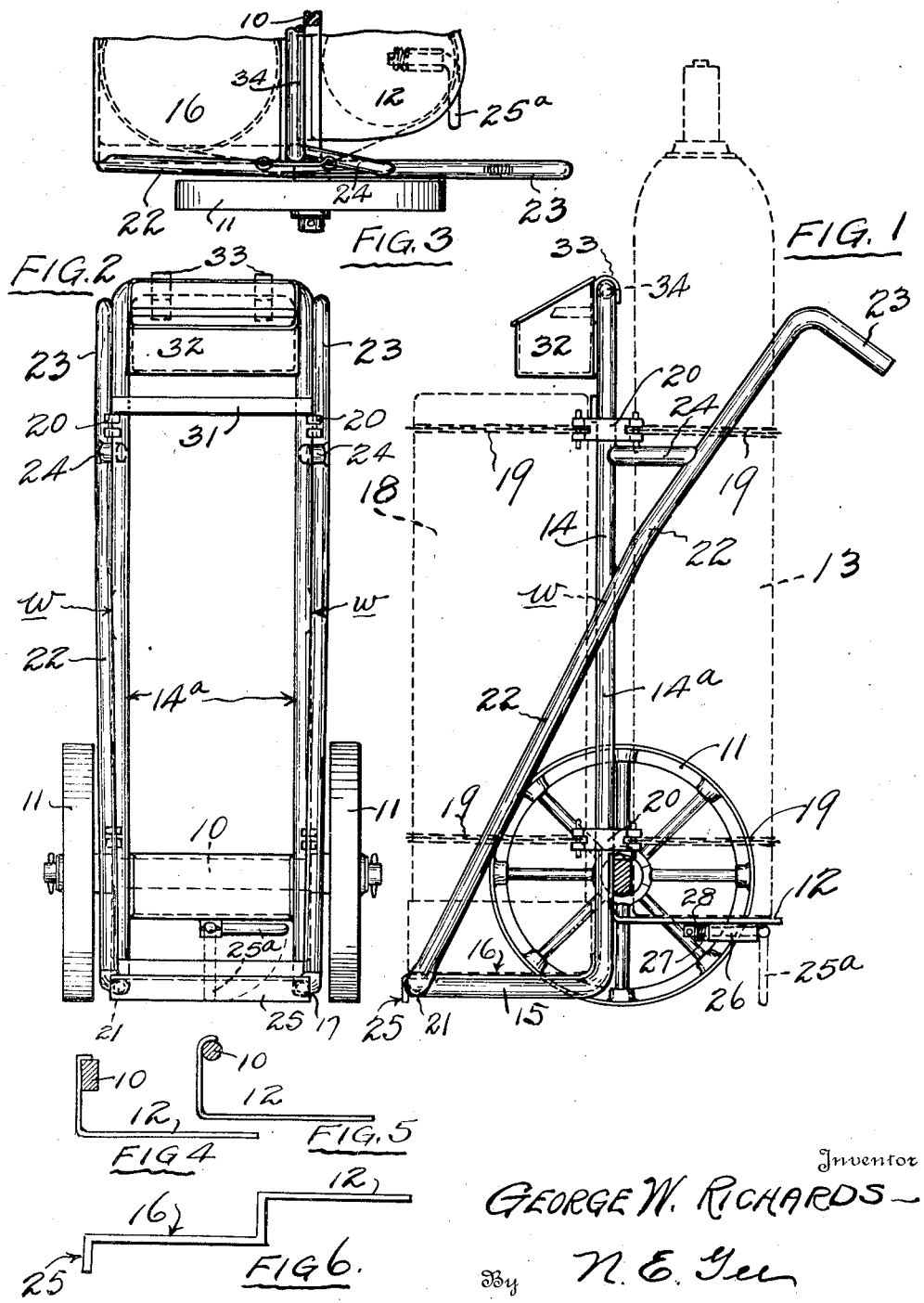

GEORGE W. RICHARDS, OF ALTOONA, PENNSYLVANIA, ASSIGNOR OF ONE-HALF TO WILLIAM P. GEIB, OF ALTOONA, PENNSYLVANIA.

TRUCK FOR GAS TANKS.

1,408,400.  Specification of Letters Patent.  Patented Feb. 28, 1922.

Application filed May 2, 1921. Serial No. 466,314.

*To all whom it may concern:*

Be it known that GEORGE W. RICHARDS, a citizen of the United States, residing at Altoona, in the county of Blair and State of Pennsylvania, has invented certain new and useful Improvements in Trucks for Gas Tanks, of which the following is a specification.

This invention relates to trucks for transporting gas tanks and has particular reference to an improved construction for carrying the gas tanks from place to place in welding and cutting operations.

A primary object of this invention is to provide a truck adapted to carry two gas tanks so that the load is balanced on the truck in such a manner as to permit easy handling of the same.

A further object of this invention is to provide a novel truck structure that provides simple and adequate means for supporting the tanks and which occupies a minimum floor space.

With these and other objects in view which will be more readily apparent as the nature of the invention is better understood the same consists in the novel construction, combination and arrangement of parts hereinafter fully pointed out illustrated and claimed.

It will be readily understood by those skilled in the art to which this invention belongs that the same is susceptible to various changes and modifications without departing from the spirit or scope of the invention, but a preferred and practical embodiment of the invention is shown in the accompanying drawings in which—

Figure 1 is a side elevation of my improved gas tank truck having two gas tanks positioned thereon.

Figure 2 is a front elevation of my improved gas tank truck with the gas tanks removed.

Figure 3 is a part plan view of the truck having two gas tanks in position.

Figure 4 is a detail view of one form of means for supporting the gas tank on the truck axle.

Figure 5 is a view similar to Figure 4 showing a modification.

Figure 6 is a detail view of a further modified form of tank supporting platform.

Similar reference numerals refer to similar parts throughout the several figures of the drawings.

In carrying out this invention I construct a truck adapted to travel on two wheels of such diameter as to give the truck body together with its load the proper balance for easy operation, and to this end I provide an axle designated by the numeral 10, for carrying the wheels 11.

Between the wheels, and resting on the axle which is preferably rectangular in section, I arrange a gas tank platform 12, which in the present invention is adapted to carry an oxygen tank 13. In addition to carrying the tank platform, the axle 10 is adapted to carry a tubular frame 14, which takes the form of an inverted U having the lower part of the legs $14^a$ bent outwardly in a direction opposite to the platform 12, to form the horizontal supports 15.

The said supports 15 of the frame 14 carry a platform 16, which in the present construction takes a substantially Z formation, the edges 17 thereof being welded to the supports 15 as well as to a portion of the upright frame bars $14^a$. The platform 16 is adapted to carry, in the present invention an acetylene tank 18. The tanks 13 and 18 are each held in place on their respective platforms by chains 19, which are anchored to a bifurcated chain support 20, carried by the frame 14 as shown in Figure 1 of the drawings.

Attached to the ends 21 of the supports 15 of the frame 14, are the tubular bars 22, which are designed to occupy an upwardly inclined position, across the tanks, outside the frame 14 to which each is welded as at W as shown in Figure 1 of the drawings. The uppermost end of the tubular bar 22 is bent at right angles to the body to form a handle 23 for the use of the workman when moving the truck from one place to another. In order that the handle may be rigidly supported to the frame 14, a strut 24 is interposed between the frame 14 and the tubular piece 22 and welded to each as shown in Figure 1 of the drawings.

The pendent lip 25 of the platform 16 is adapted to engage the surface upon which the truck is standing when in use and due to balancing the weight on the axle as shown the truck readily sits in any position when loaded as shown. It is quite obvious that the removal of the acetylene tank will unbalance the truck and for the purpose of keeping the frame in an upright position with this tank removed there is provided an L shaped support 25$^a$ having one leg of the L positioned in a housing or bearing 26, and held therein by a resilient spring 27, which is adapted to be interposed between a key and washer 28 and the end of the housing 26. When the tank 18 is removed the end of the support 25$^a$ is turned through an angle of 90° and the point engages the surface upon which the wheels rest and the truck is thus held in an upright position. The tank 18 is further provided with a transverse brace or support 31, which spans the two members of the frame 14 near the upper arched end thereof and acts as a support for the top of the gas tank.

For the purpose of carrying the necessary tools used with the burner and tanks there is provided a tool box 32 which is adapted to be fitted with a plurality of engaging hooks 33, designed to engage the top member 34 of the frame 14. The box is adapted to be readily interchangeable from one side to the other to suit the convenience of the workman, and adapted to be made in various forms and secured in various manners to the frame neither of which is an essential part of the invention.

Without further description, it is thought that the many advantages of the herein described invention will be readily apparent.

I claim—

1. A truck of the class described including a frame of substantially U-shaped formation and having the lower portions thereof offset at an angle, brace members extending upwardly from the end of the offset portions of the frame and attaching to the intermediate portion of said frame, said braces being continued to provide handle members, an axle secured to said frame, and a platform carried by the offset portion of the frame and projecting to opposite sides thereof.

2. A truck of the class described including a frame consisting of a pair of relatively upright members offset at one end and connected at the opposite end by a transverse member, a combined brace and handle member arranged obliquely to the said frame members and connected at its intermediate portion to one of said frame members and at its end connected with the offset portion thereof, and a wheeled axle bolted to said frame members and a platform also carried by said frame members.

In testimony whereof he affixes his signature.

GEORGE W. RICHARDS.